United States Patent [19]

Billings

[11] Patent Number: 4,720,331

[45] Date of Patent: Jan. 19, 1988

[54] METHOD AND APPARATUS FOR ELECTROLYZING WATER

[76] Inventor: Roger E. Billings, 3420 Pink Hill Cir., Blue Springs, Mo. 64015

[21] Appl. No.: 844,694

[22] Filed: Mar. 27, 1986

[51] Int. Cl.$^4$ ............................................. C25B 1/02
[52] U.S. Cl. .................................... 204/129; 204/257; 204/258; 204/263; 204/266; 204/283
[58] Field of Search ............... 204/256, 257, 258, 263, 204/266, 129, 283, 269–270

[56] References Cited

U.S. PATENT DOCUMENTS

| | | | |
|---|---|---|---|
| 4,026,782 | 5/1977 | Borey et al. | 204/254 |
| 4,056,452 | 11/1977 | Campbell | 204/258 |
| 4,057,479 | 11/1977 | Campbell | 204/258 |
| 4,210,511 | 7/1980 | Campbell et al. | 204/258 |
| 4,431,502 | 2/1984 | Ford | 204/252 |

Primary Examiner—R. L. Andrews
Attorney, Agent, or Firm—Litman, McMahon & Brown

[57] ABSTRACT

An electrolyzer for electrolysis of water comprises a series of cells each including a substantially open porous anode plate and a substantially open porous cathode plate disposed on either side of and in contact with a solid electrolyte membrane. First and second flow passages extend through the cell, with the first flow passage comprising concentrically aligned bores extending through the center of the cathode plate, the anode plate and the membrane, with the bore in the cathode plate being fitted with an annular sealing gasket. The second flow passage also comprises concentrically aligned bores extending through the cathode plate, the anode plate, and the membrane, with a bore in the anode plate being fitted with an annular sealing gasket. A seal is provided at the outside perimeter of the cathode plate, to prevent the escape of fluid containing hydrogen therefrom. During operation, a source of water is connected to the first flow passage and water is driven into the cell. The water diffuses through the anode plate from the central bore, and partial electrolysis occurs. Water which reaches an outer perimeter of the anode plate, without electrolysis, drains from the assembly, providing a means for cooling. Hydronium ions formed in the anode plate migrate through the membrane to the cathode plate wherein electrolysis is completed, with hydrogen formation. The water containing hydrogen gas bubbles flows through the porous cathode plate to the second flow passage, and out of the apparatus.

41 Claims, 2 Drawing Figures

METHOD AND APPARATUS FOR ELECTROLYZING WATER

BACKGROUND OF THE INVENTION

The present invention is relating to an electrolyser and to an electrode structure in such electrolyser.

The invention consists also in a method for electrolysing water by using such electrolyser.

The technology of producing hydrogen by the electrolysis of water dates back to the last century. Conventionally the process is accomplished by placing electrodes into a water solution containing electrolyte material (potassium hydroxide or hydrochloric acid). When an appropriate electrical current is passed through the electrodes, oxygen bubbles form on one electrode and hydrogen on the other. Commercial electrolysis equipment has been manufactured utilizing this technology for many years. Recently, researchers have substituted a solid polymer type membrane material between two electrodes thereby making possible the electrolysis of pure water with the advantage of more efficient conversion and lower cell maintenance costs. The solid polymer electrolyte also provides the capability of producing hydrogen at high pressure, thereby eliminating the need for expensive and energy intensive secondary compressors.

Such solid polymer electrolytes (SPE) have been disclosed in following publications: "Solid Electrolytes Offer Route to hydrogen", Chemical and engineering News, Aug. 27, 1973; "Electrolytic Hydrogen fuel Production with Solid Polymer Electrolyte Technology" by W. A. Titterinton and A. P. Fickett, VIII IECEC Proceedings; and "A Hydrogen-Energy System", published by American Gas Association, 1973. As described in these references, SPE is typically a solid plastic sheet of perfluorinated sulfonic acid polymer which, when saturated with water, becomes an excellent ionic conductor. The ionic conductivity results from the mobility of the hydrogen ions which move through the polymer sheet by passing from one sulfonic acid group to another. An anode and cathode are positioned on either side of the sheet and pressed thereagainst to form the desired SPE cell.

Electrolysis apparatus utilizing such SPE cell are described in U.S. Pat. Nos. 4,056,452 and 4,210,511.

In these patents the anode plates present in one of their sides alternating ridges and grooves. This makes the anode plates costly, as grooves are very expensive to fabricate.

Moreover, especially in the electrolyser of U.S. Pat. No. 4,210,511 so called back-up rings are used for supporting the outer O-rings which are required to seal the outer perimeter of the cathodes and to prevent the escape of hydrogen.

These back-up rings have been traditionally machined out of fiber glass and are thus very expensive.

Moreover, on several occasions they have ruptured while the electrolyser was in use causing severe damage to the cell. In addition, very tight tolerances must be maintained in the fabrication of these back-up rings in order to achieve proper sealing. These tight tolerances on such a large diameter have made the back-up rings one of the most expensive parts of the cell.

It is one of the principal objectives of the present invention to provide an improved electrolyser which is more reliable and less costly than the known electrolysers of the prior art.

A further objective of the invention is to provide an electrolyser which has improved means for supplying liquid to the anode plates and for withdrawing fluid and the products formed at the anode and cathode plates.

A still further objective of the invention is to provide a new method for electrolysis of a liquid consisting of water to produce hydrogen and oxygen therefrom.

Additional objectives are to provide a very compact electrolyser which moreover enables to obtain hydrogen at relative high pressure.

SUMMARY OF THE INVENTION

The above and other objectives of the present invention are realized in an electrolyzer comprising a single cell or a plurality of cells arranged in series. Each cell comprises an electrode structure made up of an anode plate, a cathode plate and a solid electrolyte membrane, which are secured together in side-by-side relationship.

If the electrolyser comprises a plurality of cells which have been assembled as a unitary multi-celled unit, separator plates are positioned between the anode and cathode plates of adjacent cells.

In accordance with the invention, a single cell or each individual cell comprises:

substantially open porous anode and cathode plates which are disposed on either side of and in contact with a solid electrolyte membrane, said anode and cathode plates being composed of an electrically conductive material capable of being permeated by a liquid such as water;

a first flow passage comprising concentrically aligned bores, extending substantially through the center of said cathode plate, anode plate and membrane, with the bore in said cathode plate being fitted with an annular sealing gasket;

a second flow passage comprising also concentrically aligned bores but extending eccentrically through the cathode plate, the anode plate and the membrane, with the bore in said anode plate being fitted with an annular sealing gasket;

sealing means at the outside perimeter of the cathode plate;

means for securing the cathode plate, membrane and anode plate in firm side-by-side series engagement;

means for applying to said first flow passage a liquid flowing substantially radially through said porous anode plate and wetting the membrane, so that the products produced at the interface of the membrane and anode plate diffuse through the porous anode plate and are carried radially away with the liquid to the outside perimeter of the anode plate, and products produced at the interface of the membrane and the cathode plate diffuse through the porous cathode plate to said second flow passage; and means for applying a D.C. current to the cathode and anode plates.

Preferably, both sides of the anode plate are completely flat.

In another embodiment of the invention the electrolyte structure for electrolysis apparatus comprises:

anode and cathode plates which are disposed on either side of and in contact with a solid electrolyte membrane, said anode and cathode plates being composed of an electrically conductive material, whereby at least the cathode plate is capable of being permeated by a liquid such as water, at least one flow passage comprising concentrically aligned bores, extending through said cathodic plate, anode plate and membrane;

a separator or supporting plate composed of solid non-porous electrically conductive material which is positioned with one side thereof in contact with the side of the cathode plate opposed to the side faced to the membrane, said plate having means at its perimeter for holding an annular sealing gasket provided around the outside perimeter of the cathode plate; means for securing the cathode plate, membrane, anode plate and separator or supporting plate in firm side-by-side series engagement;

means for applying a liquid wetting the anode plate and the membrane, so that the products produced at the interface of the membrane and anode plate are carried away with the liquid to the outside perimeter of the anode plate, and products produced at the interface of the membrane and the cathode plate diffuse through the porous cathode plate to said flow passage.

The invention is also relating to a method for electrolysis a liquid consisting essentially of water to produce hydrogen and oxygen therefrom, which method comprises:

positioning a solid electrolyte membrane between an open porous anode plate and an open porous cathode plate, said anode and cathode plates contacting mutually opposite sides of said membrane;

wetting with water the surfaces of the anode and cathode plates, which abut said membrane, by conveying water substantially radially from the center of the anode plate through the porous structure of the latter in the direction of its perimeter; and passing a current through said membrane from the anode plate to the cathode plate to generate hydrogen gas at the cathode plate and oxygen gas at the anode plate.

BRIEF DESCRIPTION OF THE DRAWINGS

A preferred embodiment of the electrolyser and electrode structure thereof of this invention representing the best mode presently contemplated of carrying out the invention in actual practice is illustrated in the accompanying drawings in which.

In both drawings the same reference numbers are relating to the same parts.

DETAILED DESCRIPTION OF THE ILLUSTRATED EMBODIMENT

Figure 1:
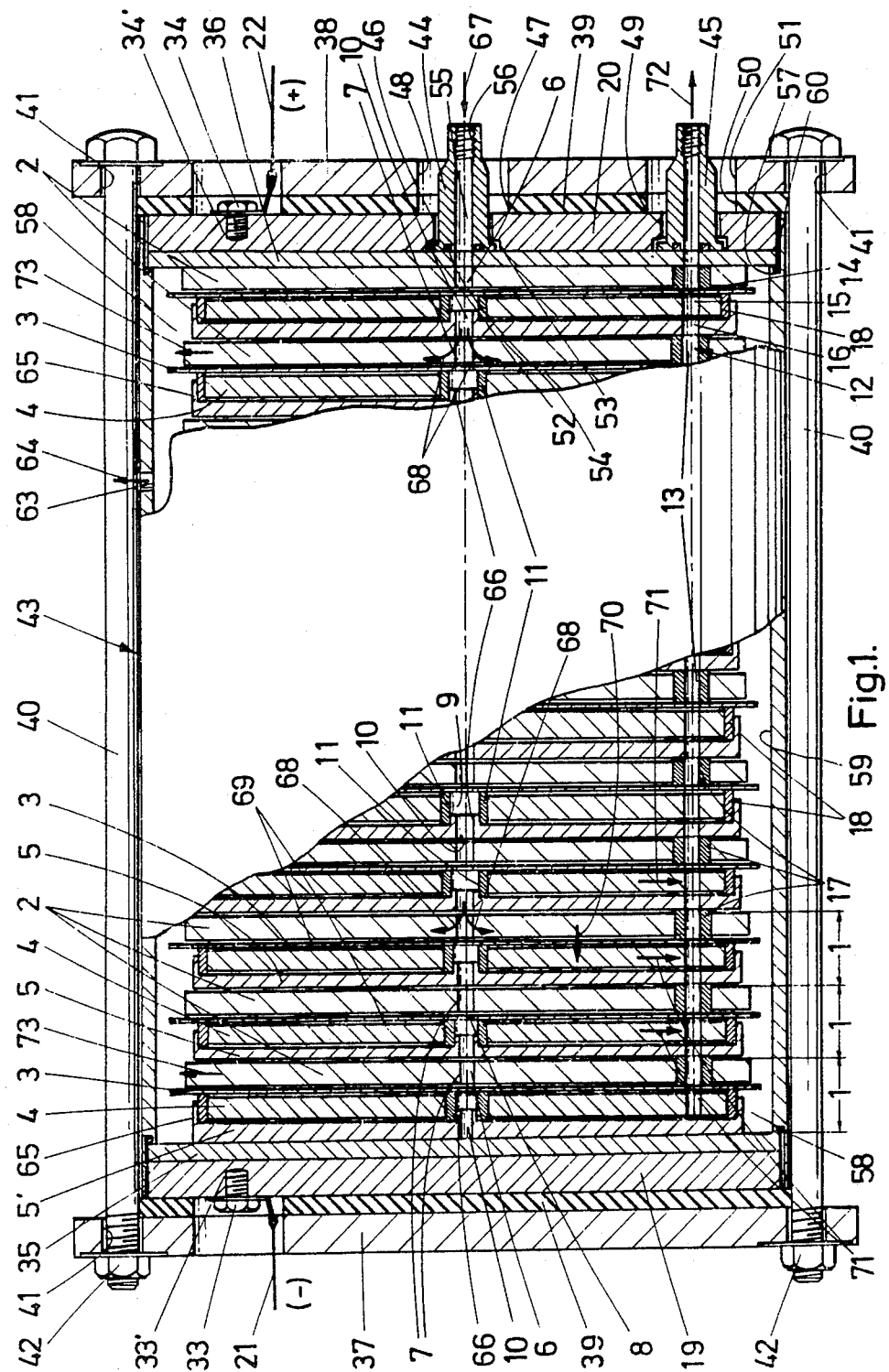
FIG. 1 is a side elevational view, partially cut away with the cut away portion shown in vertical cross-section, of the preferred electrolyser according to the invention.

The preferred embodiment of the electrolyser shown in the drawings comprises a plurality of successive cells 1, each of which being formed of an open porous anode plate 2, a solid electrolyte membrane 3 and an open porous cathode plate 4. One side of the anode plate is in contact with one side of the membrane 3 and the other side of this membrane is in contact with one side of the cathode plate 4. These anode and cathode plates 2 and 4 are composed of an electrically conductive material capable of being permiated by a liquid, such as water. By "open porous" it has to be understood that the pours are communicating at random with each other so as to form flow channels which are substantially equally distributed over the whole volume of the substrate of which the anode and cathode plates are made.

Preferably these plates are made of sintered titanium.

The different cells 1 are generally identical and are connected in series by means of a separator plate 5 composed of a solid non porous electrically conductive material, such as titanium.

Such plate 5 is positioned between two successive cells 1, in front of the lateral side of each cathode plate 4 which is opposed to the side of this latter faced to the adjacent membrane 3.

As can seen clearly from FIG. 1, the different anode plates 2, membranes 3, cathode plates 4 and separator plates 5 are all coaxially aligned side-by-side, the one against the other.

Moreover, two flow passages are penetrating through the different successive cells from one end of the electrolyser to the opposed end thereof:

(a) a first flow passage 6, comprising concentrically aligned bores 7, 8, 9 and 10, which extends through the center of respectively each of the anode plates 2, the membrane 3, the cathode plates 4 and the separator plates 5, with the bore 9 in each cathode plate 4, being fitted with an annular sealing gasket 11, generally formed of a O-ring, and (b) a second flow passage 12, which is parallel to the first flow passage 6, comprising also concentrically aligned bores 13, 14, 15 and 16 but extending eccentrically through each of the anode plates 2, membrane 3, cathode plates 4 and intermediate separator plates 5, respectively, close to the perimeter of these membranes and plates, with the bore 13 in each anode plate 2 being fitted with an annular sealing gasket 17, such as an O-ring.

Moreover, sealing means, such as an O-ring 18, surround the outside perimeter of each cathode plate 4.

The plurality of cells are further assembled between two end plates 19 and 20 composed of non porous electrically conductive material, such as aluminium. These end plates are each connected to a D.C. potential by means of an electrical conductor, respectively 21, 22 which is fixed to a lug, respectively 33, 34. These lugs are treated in a bore 33' respectively 34', extending in end plates 19 and 20. A source of positive voltage is applied to end plate 20 by the lug 34, while a source of less positive voltage is applied to the end plate 19 by the lug 33.

A current is passed from the end plate 20 to the series of the cells 1. Current passes from the anode plate 2 to the cathode plate 4 of each cell. The voltage potential across the electrolyser from end plate 20 to end plate 19 is theoretically evenly divided across the series of cells. Therefore if f.i. the electrolyser contains ten cells, the theoretical voltage potential between the cathode and anode of each cell will be equal to approximately 1/10 of the voltage potential applied across the electrolyser between end plates 19 and 20. Especially for reasons of corrosion problems, it could be useful to separate each end plate 19 and 20 from the adjacent end cell by means of an intermediate plate, respectively 35, 36, of corrosion resistant non-porous electrically conductive material, such as titanium.

Further, a flange plate respectively 37, 38, f.i. of steel, is applied flatwise against the outside of each end plate, respectively 19 and 20, while electrically insulating means are provided between the flange plates 37, 38 and the adjacent end plates 19 and 20. The electrically insulating means are preferably made of a resilient material, such as a rubber plate 39.

The diameter of the flange plates 37 and 38 is substantially larger than the diameter of the membranes and other plates, contained therebetween, the membranes and plates are all pressed together between the flange 37 and 38 plates by means of tie bolts 40, which are extending through openings 41 spaced around the outer portion of the flange plates. These tie bolts are secured by nuts 42, which enable to urge towards each other the flange plates by tightening the nuts 42 on the tie bolts 40, compressing thus on this way also the rubber plates 39 and the different sealing gaskets. A cilindrical housing 43 is positioned around the series of cells 1 in the electrolyser unit between the flange plates, whereby the bolts 40 extend outside this housing 43.

As can be seen from FIG. 1, the first axial flow passage 6 extends from the intermediate plate 35, protecting end plate 19, through all the cells until connecting means 44, provided at the opposed end of the electrolyser, at which a non represented conductor can be attached.

The free end of flow passage 6 is thus closed by means of intermediate plate 35.

On a similar way, the free end of the second flow passage 12 is closed by means of the end separator plate 5'.

Figure 2:
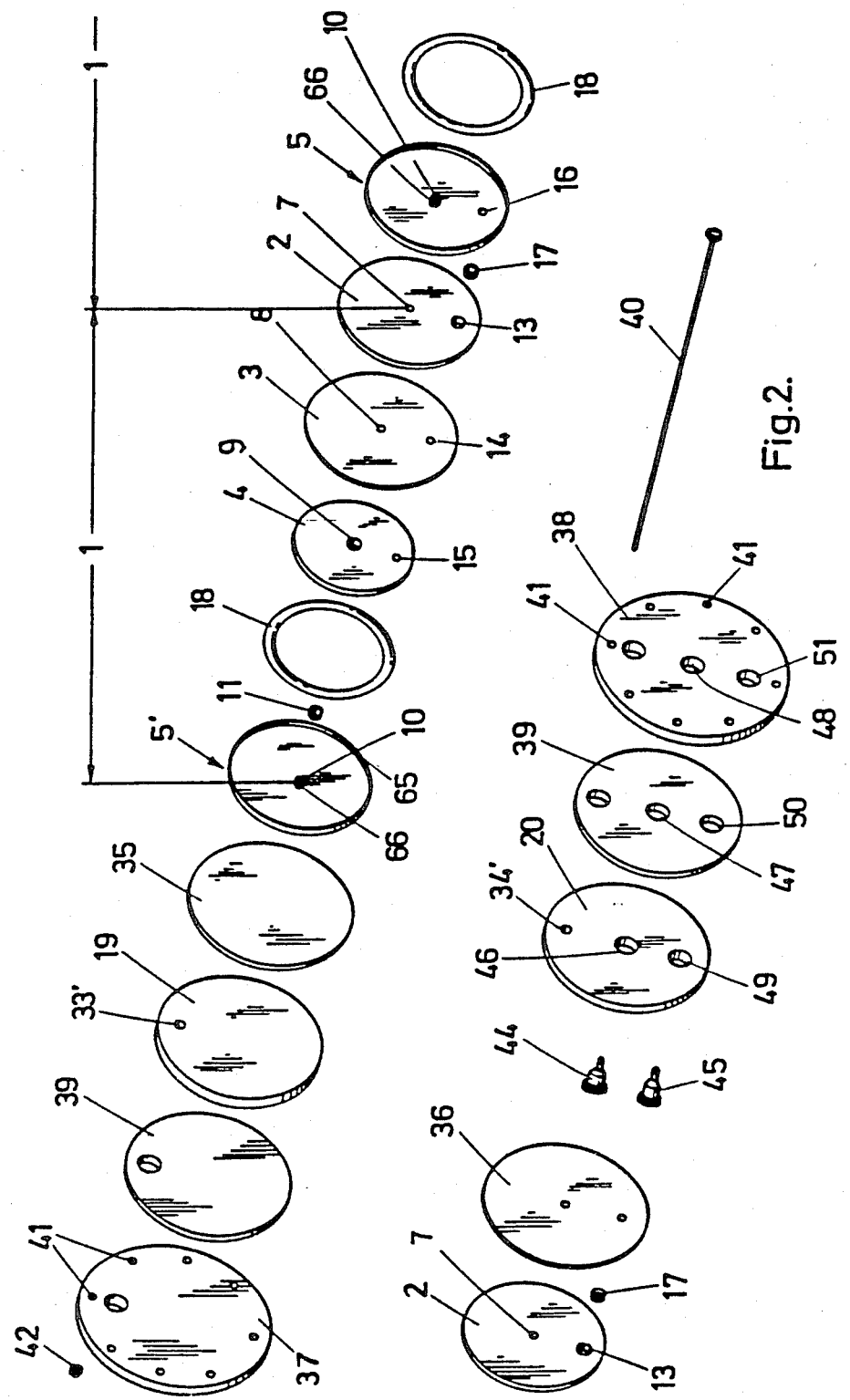
FIG. 2 is an exploded perspective view of a typical cell structure as used in the electrolyser of FIG. 1.

The difference between the end separator plate 5', also called "supporting plate", and the intermediate separator plates 5, positioned between the anode and cathode plates of two successive cells, consists in the fact that no bore 16 has been provided in this end separator plate 5', as clearly shown in FIG. 2. This means that the second flow passage 12 is somewhat shorter than the first flow passage 6.

The opposite end of the second passage 12 is also extending until connecting means 45, provided at the outside of the elctrolyser, at which also a non represented conduct can be attached.

As a result, only end plate 20, adjacent rubber plate 39 and flange plate 38 have each two openings: opening respectively 46, 47 and 48 and opening respectively 49, 50 and 51. The first series of openings 46, 47 and 48 being coaxial with the first flow passage 6, while the other series of openings 49, 50 and 51 are coaxial with the second flow passage 12.

The connecting means 44 are formed by an insert having a flanged end 52 which is positioned in the series of openings 46, 47 and 48. The flanged end 52 is fitted within a broader counter bore portion 53 of the opening 46 in the end plate 20. A sealing ring 54 is provided within an appropriate receptacle in the inner face of the insert 44, so as to realize a tight seal between the insert 44 and the intermediate plate 36 when pressing the end plate 20 against the latter.

The connecting means 45 of the second flow passage 12 comprise a similar insert, which has also a flanged end 52 disposed in a broader counter bore, wherein a sealing ring 54 provides also a liquid and gas tight seal between this insert and the intermediate plate 36.

Both inserts 44 and 45 are made of an appropriate material and have a central bord 55 therethrough which communicates with the corresponding flow passages, respectively 6 and 12.

The free end of each insert 44 and 45 extending out of the flange plate 38 is threated, as shown by reference 56, so that a conductor can be losely attached thereto.

As shown in FIG. 2, in this preferred embodiment of the invention, the anode plates 2, membranes 3, cathode plates 4, separator plates 5, end plates 19 and 20, intermediate plates 35 and 36, flange plates 37 and 38 and rubber plates 39 are all circular.

Moreover, the diameter of the membranes 3 is slightly larger than the diameter of the anodes, so that they can be arranged side by side to said anode plates with the perimeter of the membranes extending beyond the perimeter of the anode plates 2, while the cathode plates have a slightly smaller diameter than the anode plates 2.

As to the separator plates they have a slightly larger diameter than the cathode plates 4, without passing beyond the anode plates 2.

The cilindrical housing 43 is positioned around the different cells forming an annular space or jacket 58 between the innerwall 59 of the housing and the cells. An opening 63 has further been provided in this housing 43 for withdrawing fluid from the cells. It has to be noted that this fluid could be used for cooling the electrolyser. A sealing O-ring 60 is located in an annular recess 57 provided at each end of the housing, between the latter and the intermediate plates 35 and 36.

The separator plates 5 and 5' which have to be considered as very important parts of the electrolyser, according to the invention, have means at their perimeter for holding the annular sealing gasket 18 around the outside perimeter of the cathode plates 4.

In the particular embodiment represented in the figures, separator plates 5 and 5' have a lip 65 extending laterally at their side faced to the adjacent cathode plate 4, which lip 65 supporting the outer perimeter of this annular sealing gasket 18.

As already mentioned hereinabove, the intermediate separator plates 5 have a central bore 16. According to the invention, this bore is also bordered by a lip 66 extending laterally on the separator plates 5, at same side as lip 65 for holding the annular sealing gasket 11 fitting this bore 16.

Both lips 65 and 66 are preferably obtained simultaneously during a stamping operation by means of a cutting tool which has been designed so as to create these lips, respectively around the outside perimeter and around the central bore 16 of the separator plates 5.

By the fact that the lip 65 extends at the outside of the annular sealing gasket 18, if a pressure is created inside the cathode plate by the produced hydrogen gas, the lip 65 will hold this gasket 18 in place.

Moreover, when the separator plates 5 and 5' are pressed against the adjacent cathode plates 4, each gasket 18 will be compressed between a separator plate 5 and a membrane 4, because the latter is supported laterally on adjacent anode 2 having a larger diameter than the annular gasket 18. On this way there is no risk at all that fluid, containing hydrogen, could escape into the annular space 58.

Another also very important feature of the invention is the structure of the anode plates 2, which are preferably composed of a sintered metal substrate, such as titanium, having an open porosity between 30 and 80%, preferably between 40 and 50%.

Indeed, it could be important that the anode plate is very porous so as to enable that a liquid diffuses, on a substantially homogeneous way as a plug flow, from the bore 13 provided in the center of the plate outwardly through the whole volume of the anode plate.

It has been found that, on a very unexpected way, this diffusion happens without any preferred direction, so that it has not been necessary to provide grooves for obtaining a regular distribution of the liquid flow through the anode plate and at the interface of the latter with the adjacent membrane.

This has as important advantages, compared to the known designs of similar anode plates, that:

(a) all of the membrane material, forming the electrolyte, is in contact with the anode plate, thereby resulting in a lower current density and a higher cell efficiency, so that less electricity is utilized by the cell, resulting in a significant decrease in costs of generated hydrogen;

(b) the fact that, on this way, the anode plate can be flat on both sides lowers considerably the fabrication costs of the anode plates;

(c) by avoiding the grooves used in known anode plates, it is possible to make them much thinner than in previous designs, which, of course, also results in a substantial cost saving, the tickness of the anode plate is generally comprised between 0.5 mm and 1.5 mm, preferably between 0.6 and 1 mm;

(d) the liquid diffusion within the sintered substrate is more uniform and a better coooling of the cell, eliminating hot spots, is obtained;

(e) a much easier method of connection of the liquid inlet to the electrolyte plates can be realized.

Advantageously, at least the surface of the anode plates 2, which contacts the membrane is treated with catalyst coating, such as platinum, in a manner so that the anode plates maintain their porosity.

Referring in particular to FIG. 1, the use and working of the electrolyser, according to the invention, will be summarly described hereinafter for producing hydrogen and oxygen by electrolysing of water.

Water is introduced under pressure in first flow passage 6 through insert 44, as indicated by arrow 67. The water diffuses in the different anode plates from the central bores 7, provide in each anode plate and delimiting this passage 6, as indicated by the different arrows 68.

On this way, the water is conveyed radially from the center of each anode plate 2 through the porous structure of the latter, in the direction of its perimeter, so as to wet completely the whole volume of the anode plates. This water further diffuses to the interface 69 between the anode plates and the adjacent membranes, so as to wet also the latter.

By applying a negative voltage to end plate 19 and a positive voltage to end plate 20, an electrical current is produced within the different cells 1, so that the water is electrochemically decomposed at this interface 69 to provide oxygen and hydrogen ions, more particularly hydronium ions. The hydrogen ions and/or hydronium ions move through the membrane 3, as indicated by arrow 70. When these ions reach the cathode plate 4 they combine with free electrons supplied by the cathode plate to produce water and hydrogen gas. This mixture of water and hydrogen is collected in second flow passage 12, as indicated by the different arrows 71, and is evacuated at the flange plate 38, as indicated by arrow 72.

The excess of water fed to the anode plates 2, which has not crossed the membranes 3 or has not been decomposed at the interface 69, is discharged at the perimeter of each anode plate 2, as indicated by arrow 73, in the annular space 58. This water, which has been charged with oxygen, is evacuated through opening 63 of housing 43, as indicated by arrow 64.

Thanks to the very simplified design of each part of the electrolyser and the resulting very compact construction of the assembled cells, it has been possible to produce hydrogen at high pressure at the outlet, formed by insert 45.

Moreover, the design allows for no cell-water or hydrogen to come into contact with any metal inside the cell except for titanium.

This fact is very important for reducing corrosion and electrolyte side reactions.

Also, the fact that in flow passages 6 and 12 only simple O-rings have been used as sealing gaskets makes it possible to apply high pressure inside flow passages 6 and 12, without any risk of leackage.

It has to be understood that the invention has not to be restricted to the combination of the different features of the preferred embodiment of the electrolyser described hereinabove and shown in the enclosed drawings.

It would f.i. be possible to combine the separator plates 5 and 5' having retaining means for the annular sealing gasket, with a known grooved anode plate.

On a similar way, it could be possible, according to the invention, to combine an anode plate, as described hereinabove, in a cell using back-up rings machined out of fibre glas for retaining the sealing ring around the perimeter of the cathode plates, instead of the above described separated plates with means for holding this ring.

The relative dimensions, such as thickness, of the different plates of the electrolyser, according to the invention, represented in the drawings, do not necessarily correspond to those which will be used in practice.

Generally, the plates are very thin and can be less than 0.5 mm.

In the preferred embodiment, each cell was described with the water inlet passageway located in the center of the circular cells, and with the water outlet passageway, for flowing out of the water and hydrogen gas mixture, eccentrically positioned. It will be understood that while this arrangement may be preferred, especially for efficient use of a greater area of cathode and anode plates, the inlet passageway need not be centrally located. That is, the inlet passageway might be located in a position other than the centers of the anode plate, cathode plate and membrane; further, the outlet passageway need not be eccentrically positioned, with respect to the centers. It will further be understood that in some applications of the instant invention non-circular plates and membranes may be used, with the remainder of the assembly appropriately modified.

I claim:

1. An electrode structure for electrolysis apparatus comprising:

substantially open porous anode and cathode plates which are disposed on either side of and in contact with a solid electrolyte membrane, said anode and cathode plates being composed of an electrically conductive material capable of being permeated by a liquid, such as water;

a first flow passage comprising concentrically aligned bores, extending substantially through the center of said cathode plate, anode plate and membrane, with the bore in said cathode plate being fitted with an annular sealing gasket;

a second flow passage comprising also concentrically aligned bores but extending eccentrically through the cathode plate, the anode plate and the membrane, with the bore in said anode plate being fitted with an annular sealing gasket;

sealing means at the outside perimeter of the cathode plate;

means for securing the cathode plate, membrane and anode plate in firm side-by-side series engagement;

means for applying to said first flow passage a liquid flowing into and substantially radially through said porous anode plate so as to cool the anode plate and wetting the membrane, so that the products produced at the interface of the membrane and anode plate diffuse through the porous anode plate and are carried radially away with the liquid passing through the anode plate to the outside perimeter of the anode plate, and products produced at the interface of the membrane and the cathode plate diffuse through the porous cathode plate to said second flow passage; and means for applying a D.C. current to the cathode and anode plates.

2. An electrode structure according to claim 1, wherein the anode plate is a sintered metal substrate or disc having a porosity between 30 and 80%, preferably between 40 and 50%.

3. An electrode structure according to claim 1 or 2, wherein at least the side of the anode plate faced to the membrane is completely flat.

4. An electric structure according to claim 1, wherein both sides of the anode plate are completely flat.

5. An electrode structure according to claim 1, wherein the thickness of the anode plate is comprised between 0.5 and 1.5 mm, preferably between 0.6 and 1 mm.

6. An electrode structure according to claim 1, wherein at least the surface of the anode plate, which contacts the membrane is coated with platinum in a manner so that the anode plate maintain its porosity.

7. An electrode structure according to claim 1, wherein the anode plate is made of sintered titanium.

8. An electrode structure according to claim 1, wherein the cathode plate, the membrane and the anode plate are formed of coaxial mounted discs, an also coaxial liquid jacket being provided around the cathode plate, the membrane and the anode for collecting and evacuating the liquid, which has been carried radially away through the anode plate at its perimeter.

9. An electrode structure according to claim 1, further comprising a separator or supporting plate composed of solid non-porous electrically conductive material which is positioned with one side thereof in contact with the side of the cathode plate opposed to the side faced to the membrane, said plate having means at its perimeter for holding an annular sealing gasket provided around the outside perimeter of the cathode plate.

10. An electrode structure according to claim 1, further comprising a separator or supporting plate composed of solid non-porous electrically conductive material which is positioned with one side thereof in contact with the side of the cathode plate opposed to the side faced to the membrane, said plate having a lip extending laterally at its side faced to the cathode plate and being able to support the outer perimeter of an annular sealing gasket, which gasket extending around the outside perimeter of the cathode plate.

11. An electrode structure according to claim 1, further comprising a separator or supporting plate composed of a solid non-porous electrically conductive material, which is positioned with one side thereof in contact with the side of the cathode plate opposed to the side faced to the membrane, said plate having a substantial central bore, which is coaxial with said first flow passage and which is bordered by a lip extending laterally on said plate, at the side thereof faced to the cathode plate, for holding the annular sealing gasket fitting the bore in the cathode plate for said first flow passage.

12. An electrode structure according to claim 1, further comprising a separator or supporting plate composed of solid non-porous electrically conductive material which is positioned with one side thereof in contact with the side of the cathode plate opposed to the side faced to the membrane, said plate having a first lip at its outer perimeter extending laterally at its side faced to the cathode plate and being able to support the outer perimeter of an annular sealing gasket extending around the outside perimeter of the cathode plate, the separator or supporting plate composed of solid non-porous electrically conductive material having further a substantially central bore, which is coaxial with said first flow passage and which is also bordered by a second substantially similar lip extending laterally on this plate, at the same side as the first lip, for holding the annular sealing gasket fitting the bore in the cathode plate for said first passage, both lips being obtained simultaneously during a stamping operation by means of a cutting tool which has been designed so as to create said lips respectively around the outside perimeter and around the substantially central bore of the plate.

13. An electrode structure according to claim 9, wherein the plate composed of solid non-porous electrically conductive material is made of titanium.

14. An electrode structure for electrolysis apparatus comprising:
    anode and cathode plates which are disposed on either side of and in contact with a solid electrolyte membrane, said anode and cathode plates being composed of an electrically conductive material, whereby at least the cathode plate is capable of being permeated by a liquid such as water;
    at least one flow passage comprising concentrically aligned bores, extending through said cathode plate, anode plate and membrane;
    a or supporting plate composed of solid non-porous electrically conductive material which is positioned with one side thereof in contact with the side of the cathode plate opposed to the side faced to the membrane, said cathode plate having retaining means attached to and extending axially from the entire circumference of the supporting plate above the cathode plate at the perimeter of said supporting plate and an annular sealing gasket provided around the outside perimeter of the cathode plate radially interior of the retaining means and held in sealing relationship by the retaining means;
    means for securing the cathode plate, membrane, anode plate and separator or supporting plate in firm side-by-side series engagement;
    means for applying a liquid wetting the anode plate; and the membrane, so that the products produced at the interface of membrane and anode plate are carried away with the liquid to the outside perimeter of the anode plate, and products produced at the interface of the membrane and the cathode plate diffuse through the porous cathode plate to said flow passage.

15. An electrode structure according to claim 14, wherein the separator or supporting plate composed of solid non-porous electrically conductive material has a lip extending laterally at its side faced to the cathode plate and being able to support the outer perimeter of an annular sealing gasket, which gasket extending around the outside perimeter of the cathode plate.

16. An electrode structure according to claim 14, wherein the separator or supporting plate composed of a solid non-porous electrically conductive material has a substantial central bore, which is coaxial with said first flow passage and which is bordered by a lip extending laterally on said plate, at the side thereof faced to the cathode plate, for holding the annular sealing gasket fitting the bore in the cathode plate for said first flow passage.

17. An electrode structure according to claim 14, wherein the separator or supporting plate composed of solid non-porous electrically conductive material has a first lip at its outer perimeter extending laterally at its side faced to the cathode plate and being able to support the outer perimeter of an annular gasket extending around the outside perimeter of the cathode plate, the separator or supporting plate composed of solid non-porous electrically conductive material having further a bore, which is coaxial with said flow passage and which is also bordered by a second substantially similar lip extending laterally on this plate, at the same side as the first lip, for holding the annular sealing gasket fitting the bore in the cathode plate for said flow passage, both lips being obtained simultaneously during a stamping operation by means of a cutting tool which has been designed so as to create said lips respectively around the outside perimeter and around the bore of the plate.

18. An electrolyzer comprising:
a plurality of successive cells each of which comprising a substantially open porous anode plate, a solid electrolyte membrane and a substantially porous cathode plate, with one side of the anode plate being in contact with one side of the membrane and the other side of said membrane being in contact with one side of the cathode plate, said anode and cathode plates being composed of an electrically conductive material capable of being permeated by a liquid such as water, said cells being connected in series with separator or supporting plates composed of solid non-porous electrically conductive material positioned in front of the lateral side of each cathode plate, which is opposed to the side of said cathode faced to the adjacent membrane, the anode plates, membranes, cathode plates and separator plates all being coaxially aligned side-by-side the one against the other;
a first flow passage comprising concentrically aligned bores extending substantially through the center of each of said cathode plates, membranes, intermediate separator plates and anode plates, with the bore in each cathode plate being fitted with an annular sealing gasket;
a second flow passage comprising also concentrically aligned bores but extending eccentrically through each of said cathode plates, membranes, intermediate separator plates and anode plates with the bore in each anode plate being fitted with an annular sealing gasket;
sealing means at the outside perimeter of each cathode plate;
means for securing all the cathode plates, membranes, intermediate separator plates and anode plates in firm side-by-side series engagement;
means for applying to said first flow passage a liquid flowing substantially radially into and through each porous anode plate so as to cool the anode plates and wetting the adjacent membrane, so that the products produced at the interface of each anode plate and adjacent membrane of each cell diffuse through each anode plate and are carried radially away through the anode plate with the liquid to the outside perimeter of the anode plate, and products produced at the interface of each cathode plate and adjacent membrane diffuse through said cathode plate to said second flow passage; and
means for applying a D.C. current to the anode and cathode plates.

19. Electrolyser according to claim 18, wherein the anode plates are sintered metal substrates or discs having a porosity between 30 and 80%, preferably between 40 and 50%.

20. An electrolyser according to claim 18 or 19, wherein at least the side of the anode plates faced to the adjacent membranes is completely flat.

21. An electrolyser according to claim 18, wherein both sides of the anode plates are completely flat.

22. An electrolyser according to claim 18, wherein the thickness of the anode plates is comprised between 0.5 and 1.5 mm, preferably between 0.6 and 1 mm.

23. An electrolyser according to claim 18, wherein at least the surface of the anode plates, which contact the adjacent membrane, is coated with platinum in a manner so that the anode plates maintain their porosity.

24. An electrolyser according to claim 18, wherein the anode plates are made of sintered titanium.

25. An electrolyser according to claim 18, wherein the cathode plates, the membranes and the anode plates are formed of coaxial mounted discs, an also coaxial liquid jacket being provided around the plurality of cells for collecting and evacuating the liquid, which has been carried radially away through the anode plates, at their perimeter.

26. An electrolyser according to claim 18, wherein said separator plates have means at their perimeter for holding an annular sealing gasket provided around the outside perimeter of each of the cathode plates.

27. An electrolyser according to claim 18, wherein said separator plates have a lip extending laterally at their side faced to the adjacent cathode plates and being able to support the outer perimeter of an annular sealing gasket, which gasket extending around the outside perimeter of each of the cathode plates.

28. An electrolyser according to claim 18, wherein said separator plates each have substantially central bore, which is coaxial with said first flow passage and which is bordered by a lip extending laterally on said plates, at the side thereof faced to the adjacent cathode plate, for holding the annular sealing gasket fitting the bore in this cathode plate for said first flow passage.

29. An electrolyser according to claim 18, wherein said separator plates have a first lip at their outer perimeter, extending laterally at their side faced to the adjacent cathode plates and being able to support the outer perimeter of an annular sealing gasket extending around the outside perimeter of the cathode plates, said separator plates having further a substantially central bore, which is coaxial with said first flow passage and which is also bordered by a second substantially similar lip extending laterally on this plate, at the same side as the first lip, for holding the annular sealing ring fitting the bore in the cathode plates for said first passage, both lips being obtained simultaneously during a stamping operation by means of a cutting tool which has been designed so as to create said lips respectively around the outside perimeter and around the substantial central bore of the separator plates.

30. An electrolyser according to claim 18, wherein the separator plates are made of titanium.

31. An electrolyser according to claim 18, wherein the plurality of cells are assembled between two end plates composed of a non-porous electrically conductive material, means being provided for connecting a D.C. potential to one of the end plates and a D.C. potential, which is negative with respect to said first potential, to the other end plate.

32. An electrolyser according to claim 31, wherein each end plate is separated from the adjacent end cell by means of an intermediate plate of corrosion resistant non-porous electrically conductive material, of titanium.

33. An electrolyser according to claim 31, wherein a flange plate is applied flatwise against the outside of each end plate, electrically insulating means being provided between the flange plates and the adjacent end plate.

34. An electrolyser according to claim 33, wherein the electrically insulating means are made of a resilient material, of rubber.

35. An electrolyser according to claim 18, wherein said first and said second flow passages extend through said plurality of successive cells, from one end thereof to the other, both flow passages being closed at the outside of the same end cell and crossing the opposed end cell untill connecting means are reached provided at the outside of the electrolyser, at which a conductor can be attached.

36. An electrolyser according to claim 33, wherein at least one end plate and the adjacent flange plate have at least an opening which is coaxial with one of said flow passages, an insert having a flanged end being positioned in said openings, the flanged end fitting within a broader counterbore portion of said opening in the end plate and cooperating tight with the adjacent intermediate plate, the insert having a central bore therethrough which communicates with said flow passage, means being provided at the insert so that a conduct can be attached thereto.

37. An electrolyser according to claim 33, wherein only one end plate and the adjacent flange plate have each two openings therethrough, the first openings being coaxial with said first flow passage, the second opening being in communication with said second flow passage, an insert having a flanged end being positioned in each said pair of coaxial first and second openings and cooperating tight with the adjacent intermediate plate, said inserts having a central bore therethrough which communicates with the corresponding flow passage, means being provided at each insert so that a conductor can be attached thereto.

38. An elecrolyzer comprising:
an anode plate composed of an open porous, electrically conductive material, said anode plate being circular and having a substantial central bore and an eccentric bore therethrough from one side thereof to the other; a solid electrolyte membrane having the same general shape as the anode plate but with a slightly larger diameter, so that the membrane can be arranged side-by-side to said anode plate with the perimeter of the membrane extending beyond the perimeter of the anode plate, the membrane having also a central bore and an eccentric bore therethrough from one side thereof to the other;
a cathode plate composed of an open porous electrically conductive material, said cathode plate having the same general shape as said anode plate and said membrane but having a slightly smaller diameter than the anode plate, the cathode plate having also a central bore and an eccentric bore therethrough from one side thereof to the other;
a separator plate composed of solid non-porous electrically conductive material positioned in front of the lateral side of each cathode plate, which is opposed to the side of said cathode faced to the adjacent membrane, the separator plate having the same general shape as the cathode plate but with a slightly larger diameter than the cathode plate, and having an axial extension from the perimeter of the separator plate extending over the entire circumference of the cathode plate, the separator plates, except the separator plate positioned at the outside of the end cell, in front of the end cathode plate, having a substantial central bore and an eccentric bore therethrough from one side thereof to the other; a first sealing gasket, one sealing gasket for each cathode plate, said gasket being maintained by the separator plate extension in sealing relation over the associated cathode plate and being adapted to circumscribe the outside perimeter of said cathode plate;
a second annular sealing gasket fitted in the central bore of each cathode plate;
a third annular sealing gasket fitted in the eccentric bore of each anode plate;
means for securing the anode plate, the solid electrolyte membrane and the cathode plate in side-by-side relationship to form a cell, wherein one side of the anode plate is in contact with one side of the solid electrolyte membrane and the other side of said membrane is in contact with one side on the cathode plate, with said anode plate, solid electrolyte membrane and separator plate being aligned so that the respective central bores therethrough are in concentric alignment to form a first flow passage extending through the cell and the eccentric bores therethrough are in concentric alignment to form a second flow passage extending through the cell, substantially in a parallel direction with the first flow passage; a cylindrical housing positioned around the cell and forming an annular space around the cell wherein liquid, flowing radially through the porous anode plate from the central bore provided in the latter in the direction of its perimeter, can be collected;
means for conveying a liquid to said first passage so as to enable the liquid to flow through the porous anode plate;
first means for evacuating liquid and products produced at the interface of the membrane and anode plate and collected in said annular space;

second means, in combination with said second flow passage, for receiving products produced at the interface of the membrane and cathode plate; and means for applying a D.C. current to the anode and cathode plates.

39. A method for electrolysis of a liquid consisting essentially of water to produce hydrogen and oxygen therefrom, said method comprising:

positioning a solid electrolyte membrane between an open porous anode plate and an open porous cathode plate, said anode and cathode plates contacting mutually opposite sides of said membrane;

wetting with water the surfaces of the anode and cathode plates, which abut said membrane, by conveying water substantially radially from the center of the anode plate into and through the open porous structure of the anode plate in the direction of its perimeter; and passing a current through said membrane from the anode plate to the cathode plate to generate hydrogen gas at the cathode plate and oxygen gas at the anode plate.

40. A method according to claim 39, wherein an anode plate is used which presents two substantially flat sides.

41. An electrode structure and electrolysis apparatus comprising:

substantially open porous anode and cathode plates which are disposed on either side of and in contact with a solid electrolyte membrane, said anode and cathode plates being composed of an electrically conductive material capable of being permeated by a liquid, such as water;

a first flow passage comprising concentrically aligned bores, extending substantially through each of said cathode plate, anode plate and membrane, with the bore in said cathode plate being fitted with an annular sealing gasket;

a second flow passage also comprising a second set of concentrically aligned bores passing through each of said cathode plate, anode plate and membrane, with the bore in the anode plate being fitted with an annular sealing gasket;

sealing means at the outside perimeter of the cathode plate;

means for securing the cathode plate, membrane and anode plate in firm side-by-side series engagement;

means for applying to said first flow passage a liquid flowing substantially radially into and passing through said porous anode plate and wetting the membrane, so that the products produced at the interface of the membrane and anode plate diffuse into and substantially pass through the porous anode plate with the liquid passing through the anode plate and are carried radially away with the liquid to the outer perimeter of the anode plate, and products produced at the interface of the membrane and the cathode plate diffuse through the porous cathode plate to said second flow passage; and means for applying a D.C. current to the cathode and anode plates.

* * * * *